Aug. 11, 1936.  L. J. GRUBMAN  2,050,884
SOFT RUBBER DOLL HEAD AND MOVABLE EYE MECHANISM THEREFOR
Filed April 6, 1933  2 Sheets-Sheet 2
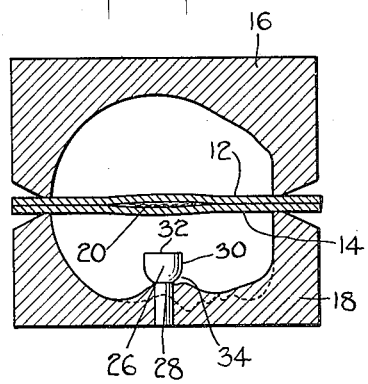
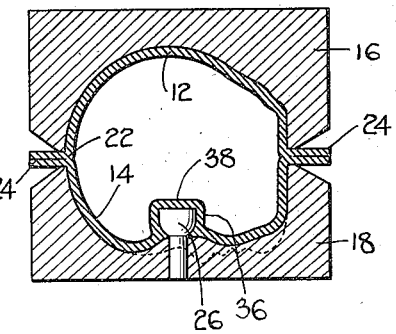
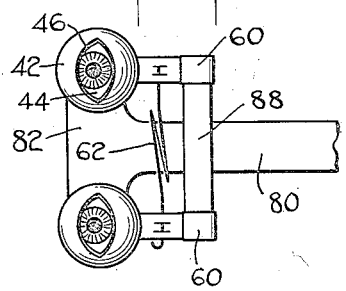
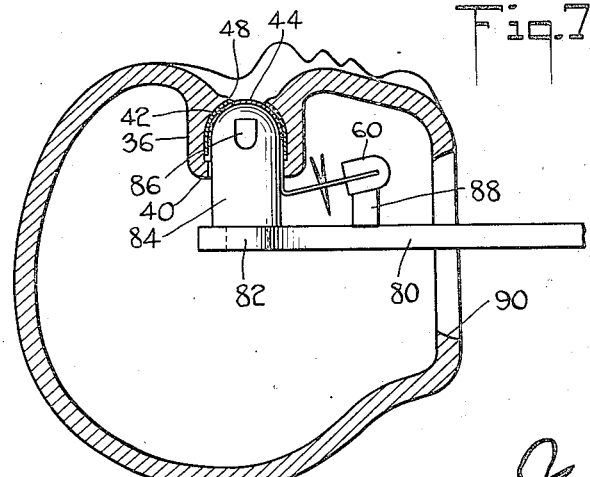
INVENTOR
Leo J. Grubman
BY
James + Franklin
ATTORNEYS Patented Aug. 11, 1936

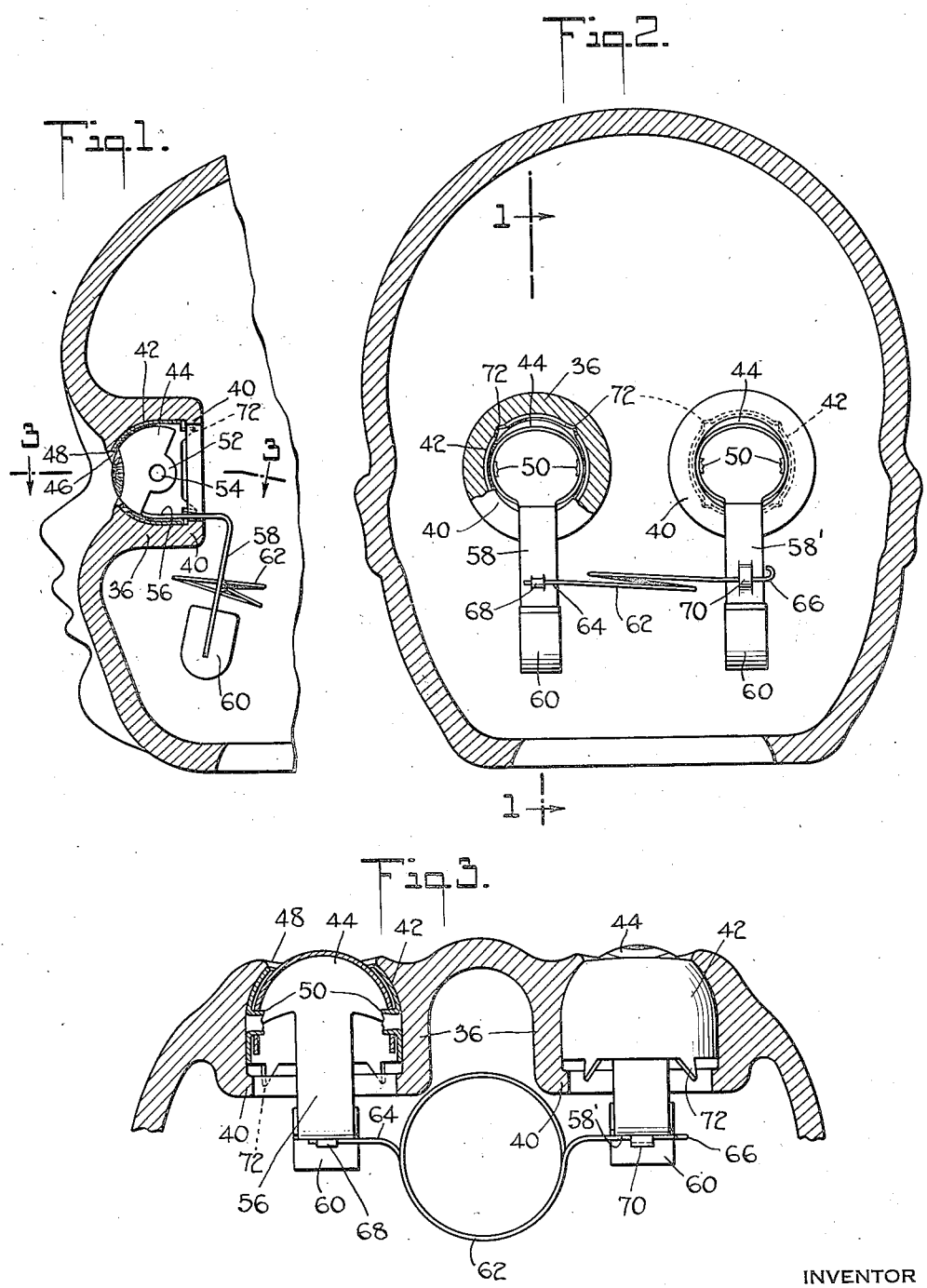

2,050,884

UNITED STATES PATENT OFFICE 2,050,884

SOFT RUBBER DOLL HEAD AND MOVABLE EYE MECHANISM THEREFOR

Leo J. Grubman, Belle Harbor, N. Y., assignor to Margon Corporation, New York, N. Y., a corporation of New York Application April 6, 1933, Serial No. 665,928

19 Claims. (Cl. 46—169)

This invention relates to movable eyes for dolls' heads, and more particularly to such eyes adapted for use with soft rubber heads, and more especially to a soft rubber head of the blown type combined with movable eye mechanism.

The conventional forms of movable eye set for dolls' heads are not very satisfactory when dealing with the relatively soft rubber heads which have recently come into vogue. Special eye sets and mountings for the same have been devised for use with soft and semi-soft heads, but these in practically all cases require a molding of the shape of the head both internally as well as externally, for the head is ordinarily provided with appropriate abutments or inwardly directed protuberances especially designed to receive the eye set mounting. This necessitates that the head be molded about a core in order to form these internal abutments, and, even so, the eye sets are satisfactory only with partially vulcanized or semi-soft heads, rather than truly soft and completely yieldable heads.

The primary object of the present invention resides in the provision of eye mechanism adapted for use with a soft rubber head of the blown variety. This type of head is formed by blowing apart two sheets of rubber material within the halves of a mold, no core being used within the head, and the resulting head having a substantially uniform wall thickness. This prohibits the provision of special internal abutments or projections for cooperation with an eye set mounting means. In accordance with the present invention the head is provided at each eye opening with an inwardly recessed casing for subsequently receiving individual eye assemblies, and this casing may be formed integrally with the head wall when blowing or molding the entire head. While the invention herein disclosed is of especial advantage because it makes possible the provision of movable eyes in heads of the blown type, it will be understood, as the description proceeds, that it may also be used, if desired, with rubber heads molded about a core, that is, molded both internally and externally.

Still another object of the present invention resides in the provision of movable eye mechanism adapted for use in a doll head, however soft, the mechanism being so designed that extreme distortion and bending or crushing of the soft and yieldable head does not injure or incapacitate the eye mechanism. With this object in view, the head is provided with separate eye assemblies, each of the eye shells being mounted and freely oscillatable at its own eye opening, so that the eye assemblies may move relative to one another, as desired, when the head is squeezed or otherwise misshapen. At the same time, appropriate means is provided to insure simultaneous opening or closing of the eyes, and this means in itself is so designed as not to be injured by distortion of the head or relative movement of the eye assemblies. The present eye mechanism further comprehends the use of individual fixed protective housings or sockets immediately surrounding each of the oscillatable eye shells and located within the rubber casings of the head, these socket members providing a fixed and uniform clearance for the eye shell and protecting the eye shell against binding or injury by reason of distortion of the rubber head in the immediate vicinity of the eye opening itself.

Still further objects of the present invention are to pivot the oscillatable eye shells within the housings or sockets in a simple and economical manner; to fix the sockets in place securely, dependably, and permanently; and to devise a method for making the soft rubber heads, particularly by the blown process, while providing the same with eye openings and support casings located thereat, as well as a method for applying the eye mechanism to the head.

A more specific object of my invention in connection with the blown type of head is to provide rubber casings on the head adapted for receiving and supporting the movable eyes, the said casings being fully enclosed at the time of manufacture and being thereby suitable for the blown type of head, but being readily punched or severed on a fully accessible wall thereof to open the same for easy insertion of the eye mechanism. Considered more generally, this object comprehends the provision of rubber casing members at each of the eye openings adapted to receive and support eye mechanism and open at the rear wall thereof to facilitate insertion of the eye mechanism through the neck opening and the interior of the dolls' head. A further object is to form, at the rear of each casing member, a retaining flange or ledge for helping to hold the inserted eye mechanism within the casing member.

Still another object of my invention centers about the connection between the individual eye members for insuring simultaneous operation thereof, and resides in the provision of such a connection which will be universally yieldable to excessive distorting pressure applied to the head, and yet which will be sufficiently stiff to over-come the normal friction of each individual eye member within its surrounding socket or caused by the pivoting of the eye member or other connections in the mounting.

To the accomplishment of the foregoing and such other objects as will hereinafter appear, my invention consists in the soft rubber doll head and the movable eye elements therefor, as well as their relation one to the other, as hereinafter are more particularly described in the specification and sought to be defined in the claims. The specification is accompanied by drawings, in which:

Fig. 1 is a vertical section taken through a doll head embodying features of the present invention, said section being taken through an eye opening, as is indicated by the line 1—1 in Fig. 2;

Fig. 2 is a section taken through the head, looking forwardly at the eye mechanism;

Fig. 3 is a horizontal section taken in the plane of the line 3—3 of Fig. 1;

Fig. 4 is a schematic section through a mold, and illustrates a preliminary step in the manufacture of the head;

Fig. 5 is a similar view showing a later stage in the manufacture of the head;

Fig. 6 is a plan view of the eye mechanism mounted upon an appropriate tool for insertion in the head; and Fig. 7 is a vertical section showing the manner of application of the eye mechanism to the head.

While the eye set of the present invention is adapted for a variety of uses, it is particularly valuable for use with a soft rubber head of the blown type. In order to understand this aspect of the invention, the method of manufacture of the blown type of head will be briefly and schematically referred to, but it should be understood that this description is offered merely by way of explanation and does not itself constitute a primary part of the invention, and, accordingly, manufacturing details and refinements in the production of such heads need not be considered.

Referring to the drawings and more particularly to Figs. 4 and 5 thereof, a typical method of manufacturing a rubber head of the blown type, considered in a general way, includes the clamping of superimposed plies or sheets of rubber 12 and 14 between the the halves 16 and 18 of a mold, an appropriate chemical substance 20 being preliminarily disposed between the plies of rubber. Upon heating of the mold, the compressed edges of the rubber fuse or coalesce, and at the same time the chemical substance 20 expands and blows the resulting enclosed envelope outwardly until it completely fills the cavity of the mold, the product then being in the intermediate condition shown in Fig. 5, the plies 12 and 14 being joined to form a peripheral seam 22 and being forced outwardly to fill the mold. The excess material 24 is subsequently trimmed from the head. It will be evident that this mode of manufacture produces a head having a substantially uniform thickness, making it impossible to provide the head with special abutments or thickened portions for cooperating with the mounting means of a movable eye set. In fact, so far as I am aware, no attempt has ever been made to equip this type of head with movable eyes.

In accordance with the present invention, the head, although necessarily a fully enclosed envelope of substantially uniform thickness, is nevertheless provided with eye mounting means for receiving a movable eye set, and this is done by adding to the mold portion 18, defining the front wall of the head, appropriate plugs or inserts 26 which, at the surface of the mold or at the point 28, form generally elliptical outlines corresponding to the desired shape of the eye opening. Within the mold the plugs 26 flare outwardly to form a casing which is generally cylindrical on its outer wall 30, flat at its rear wall 32, and hemispherical at the front wall 34. When the rubber ply 14 is forced downwardly by the gas pressure developed within the head, it wraps itself around the insert 26, in the manner shown in Fig. 5, thereby forming an enclosed eye casing 36. When the head has been completely formed and appropriately treated, the rear wall 38 of the casing 36 is punched or severed to remove therefrom a circular disc of material which preferably is smaller in diameter than the interior of the casing 36, thereby leaving a peripheral flange or shoulder 40 at the rear of casing 36, as will be clearly evident from an inspection of Figs. 1, 3, or 7.

The eye mechanism of the present invention, intended for direct insertion in the casings 36, preferably includes separate eye assemblies, one for each of the casings 36. The eye assembly comprises an outer shell or housing 42 formed of sheet metal and serving to protectively receive and oscillatably carry an eye shell 44. The housing or socket 42 is cut away at the front wall thereof to form an eye opening 46 and thus expose the eye member 44 to the eye opening 48 in the head. For maximum protection of the eye shell 44, and in order to establish a fixed clearance therearound, regardless of squeezing and distortion of the soft rubber head, the opening 46, cut in the front wall of the housing 42, is preferably elliptical in outline, as is best shown in Fig. 6, and dimensioned to mate fairly accurately with the eye opening 48 in the head. The body portion of housing 42 is, of course, cylindrical and dimensioned to fit snugly within casing 36, while the front wall portion of housing 42 is, of course, hemispherical and dimensioned not only to fit within housing 36, but also to mate concentrically with eye shell 44 and to permit free oscillation of the eye shell within the housing.

The eye shell is oscillatably carried by the housing in a simple, effective and economical manner by punching bearings 50 inwardly from the housing 42, as is best shown in Figs. 2 and 3. The eye shell 44 is itself provided with rearwardly projecting ears 52 perforated at 54 at the extremities of a diameter of the spherical surface. In practice, the eye member 44 is placed within the housing 42, after which an appropriate jig or fixture is employed to punch the side walls of the housing 42 inwardly at the bearing holes 54, thus forming bearings on which the eye shell is occilatable.

The eye shell 44 is oscillated by a gravity operated weight, and for this purpose the eye shell is formed with a weight arm having a rearwardly extending portion 56 and a downwardly extending portion 58 to the lower end of which there is secured a weight 60. The weight arm is preferably and most simply formed integral with the eye shell, particularly when the eye shell is pressed out of sheet metal.

As so far described, the eye assemblies are entirely separate and independent, and the eye mechanism may, if desired, be employed in this fashion. However, I consider it preferable to insure that the eye members 44 will operate together, but at the same time the independence or relative movability of the eye assemblies should preferably be retained because the eye mechanism is then in no way injured even if the soft rubber head is squeezed and deformed far out of shape. With this object in view, I interconnect the eye assemblies or, more specifically, the weight arms 58 by a piece of spring wire 62, preferably coiled, as is clearly evident from an inspection of Figs. 1, 2, and 3, and having oppositely directed ends 64 and 66. The end 64 is secured to weight arm 58 in an immovable manner, while the end 66 is preferably left reciprocable in the other weight arm 58'. In each case the sheet metal of the weight arm is incised and pressed to displace straps 68 and 70 of the metal rearwardly, thereby forming means for anchoring the spring wire to the weight arm. Because of the readily flexible nature of the connecting link 62, as well as the reciprocable connection between it and weight arm 58', the eye assemblies may be relatively displaced without injury; and, in practice, I find it possible to deform the head to an extraordinary degree, in most cases without interfering with the desired operation of the eye mechanism, and in all cases without damaging the eye mechanism, for upon release of the head the link 62 immediately reassumes its normal shape while the eye assemblies themselves are, of course, unaltered.

The housings 42 may be held within the casings 36 solely by the frictional fit therebetween, the casing preferably being stretched outwardly somewhat by the housing. However, I prefer to additionally anchor the housing securely within the casing and to guard against any possibility of rotation of the housing in the casing, by providing the casing with tangs which are embedded in the rubber material of the head. As specifically illustrated in the present invention, the rear edge of the housing 42 is provided with a plurality of rearwardly and outwardly directed tangs 72, and these are embedded in the rear portion of the casing 36. The flange or shoulder 40 at the rear of casing 36 serves a dual function intending itself to keep the housing in place, and in providing material for receiving the tangs 72.

The manner in which the eye assemblies are applied to the head is best explained with reference to Figs. 6 and 7 of the drawings. For this purpose, an appropriate tool or fixture is provided, the remote end of which may be rigidly mounted upon an appropriate base secured to a work bench or the like, and the near or forwardly projecting end 80 of which is provided with a cross bar 82 having at its ends upwardly projecting bosses 84 dimensioned to receive the eye assemblies. The boss 84 may be recessed at 86 to clear the bearings 50 of the housing 42. If desired, the arm 80 may be additionally provided with a cross bar 88 serving to support the weights 60 of the eye assemblies.

In operation, the eye assemblies are placed upon the bosses 84, as is clearly shown in Fig. 6. The rubber head, which is conventionally provided with a neck opening 90, is then slipped over the arm 80 and the eye assemblies, until the eye openings 48 of the head are brought over the eye assemblies, whereupon the head may be pushed downwardly over the same. The eye assemblies are thus forced into the casings 36, as is clearly evident from an inspection of Fig. 7 of the drawings. When the head is lifted upwardly from the support arm 80, the eye assemblies come off the fixture with the head. To finish seating the prongs 72 in the casings 36, the operator may then press inwardly through the eye openings upon the eye assemblies, but this is not essential.

It is believed that the mode of practicing the present invention, as well as the many advantages thereof, will be apparent from the foregoing detailed description. The contruction of the eye assemblies permits extreme distortion or deformation of the head, for individual eye assemblies are used and these may be moved relative to one another, as desired. Despite this fact, the eyes are connected together and move together. Each eye shell is immediately surrounded by a reinforcing housing which establishes a predetermined desired amount of clearance for the eye shell, and which further provides bearings for affording oscillation of the eye shell, and, finally, which prevent any deformation of the head from being transmitted to the rubber eye opening itself, thereby damaging or at least binding the eye. Most important of all, however, is the fact that the eye mechanism herein disclosed is applicable not only to soft or fully flexible rubber heads, but also to rubber heads of the blown type.

It will be understood that, while the invention is particularly applicable to blown rubber heads, it is not confined thereto and may equally well be used with rubber heads molded upon a core, and, further, that the head may, if desired, be partially hardened instead of being fully flexible. The weight arms, while shown formed integrally with the eye member, may, of course, be made as separate units and attached to the eye members. The metallic sockets, while preferably provided with a plurality of tangs distributed therearound in the manner shown, may, if desired, have only a single tang which is sufficient to guard against rotation of the housing within the rubber casing. In the foregoing specification, as well as in the appended claims, when I refer to the opening in the front wall of the socket member as mating with the eye opening, I wish it to be understood that this relation need only be approximate, and that in practice it is actually preferable to make the opening in the socket member slightly larger than the eye opening, thereby avoiding the possibility of the edge of the inner opening being visible through the eye opening. This increase in dimension is, of course, preferably kept sufficiently small to fully support the rubber eye openings and to prevent the same from curling inwardly into frictional contact with the oscillatable eye members.

It will also be understood that the linkage interconnecting the eye assemblies may, if desired, be varied in form, and, in fact, omitted entirely. It will therefore be apparent that while I have shown and described my invention in preferred form, many changes and modifications may be made in the structure disclosed, without departing from the spirit of the invention, defined in the following claims.

I claim:

1. A doll's eye assembly comprising an outer protective sheet metal housing the front portion of which is open, and a hemispherical eye shell mounted within said housing, the material of the housing being so punched inwardly at the side walls thereof as to displace but not remove metal, the displaced metal itself forming bearings mating with pivot holes in the side walls of the eye shell.

2. A doll's eye assembly comprising an outer protective sheet metal eye socket the front portion of which is hemispherical and cut away to mate with the eye opening in a doll's head, a hemispherical eye shell mounted within said socket, the material of the side walls thereof as to punched inwardly at the side walls thereof as to displace but not remove metal, the displaced metal itself forming bearings passing through pivot holes in the side walls of the eye shell.

3. A doll's eye assembly comprising an outer protective sheet metal eye socket shell the front portion of which is hemispherical and cut away to mate with the eye opening in a doll's head, a hemispherical eye shell mounted within said outer shell, the outer shell being so punched inwardly at the side walls thereof as to displace but not remove metal, the displaced metal itself forming bearings passing through pivot holes in the side walls of the eye shell, said outer shell being further provided with tangs to help mount the same in the head, the eye shell including a weight arm carrying an operating weight.

4. An eye set for a doll's head, said eye set comprising a pair of independently vertically oscillatable eye shells each provided with a stiff depending weight arm rigidly attached thereto, and means interconnecting the weight arms for insuring simultaneous vertical oscillation of the eye shells, said means including a piece of flexible spring wire having oppositely projecting ends secured to said weight arms and yieldably interconnecting the same.

5. An eye set for a doll's head, said eye set comprising a pair of independently vertically oscillatable eye shells each provided with a depending weight arm, and means interconnecting the weight arms for insuring simultaneous vertical oscillation of the eye shells, said means including a piece of spring wire having one end fixed to one of the weight arms, and the other end passing reciprocably through the other of the weight arms.

6. An eye set for a doll's head, said eye set comprising a pair of independently vertically oscillatable eye shells each provided with a stiff depending weight arm rigidly attached thereto and each arm carrying an operating weight, and means interconnecting the weight arms for insuring simultaneous vertical oscillation of the eye shells, said means including a centrally coiled piece of spring wire with oppositely projecting ends secured to the weight arms.

7. An eye set for a doll's head, said eye set comprising a pair of independently vertically oscillatable eye shells each provided with a depending weight arm and operating weight, and means interconnecting the weight arms for insuring simultaneous vertical oscillation of the eye shells, said means including a centrally coiled piece of spring wire with oppositely projecting ends, one of said ends being fixed to one of said weight arms, and the other of said ends passing reciprocably through the other of the weight arms.

8. An eye set for a doll's head, comprising a pair of eye assemblies, each eye assembly including an outer protective sheet metal housing the front portion of which is open, a hemispherical eye shell mounted within said housing, the housing being so punched inwardly at the side walls thereof as to displace but not remove metal, the displaced metal itself forming bearings mating with pivot holes in the side walls of the eye shell, and a weight arm on said eye shell, the pair of eye assemblies including resilient means yieldably interconnecting the same to insure simultaneous movement of the otherwise independently oscillatable eye shells.

9. An eye set for a doll's head, comprising a pair of eye assemblies, and interconnecting means to insure simultaneous vertical movement of the otherwise independently vertically oscillatable eye shells thereof, each eye assembly including an outer protective eye socket the front portion of which is hemispherical and cut away to mate with the eye opening in a doll's head, a hemispherical eye shell oscillatably mounted within said socket, and a stiff weight arm rigidly mounted on said eye shell, the said interconnecting means comprising a centrally coiled piece of spring wire having oppositely projecting ends secured to the weight arms.

10. An eye set for a doll's head, comprising a pair of eye assemblies, and interconnecting means to insure simultaneous movement of the otherwise independently oscillatable eye shells thereof, each eye assembly including an outer protective sheet metal eye socket the front portion of which is hemispherical and cut away to mate with the eye opening in a doll's head, a hemispherical eye shell mounted within said socket, the socket being so punched inwardly at the side walls thereof as to displace but not remove metal, the displaced metal itself forming bearings passing through pivot holes in the side walls of the eye shell, said eye shell including a rearwardly and then downwardly extending stiff weight arm carrying an operating weight, the said interconnecting means including a piece of flexible spring wire yieldably interconnecting the depending weight arms.

11. A rubber doll head including eye openings and an inwardly projecting casing at each of the eye openings, and eye assemblies in said casings, each eye assembly comprising an outer protective sheet metal eye socket the front portion of which is open and which is snugly received in the rubber casing, and a hemispherical eye shell mounted within said socket, the socket being so punched inwardly at the side walls thereof as to displace but not remove metal, the displaced metal itself forming bearings mating with pivot holes in the side walls of the eye shell.

12. A rubber doll head including eye openings and an inwardly projecting casing at each of the eye openings, and eye assemblies in said casings, each eye assembly comprising an outer protective sheet metal eye socket the front portion of which is open and the outer portion of which is snugly received in the rubber casing, and a hemispherical eye shell oscillatably mounted within said socket, said socket being integrally formed with rearwardly and outwardly sloping tangs embedded in the rubber casing.

13. A soft rubber doll head of the blown variety including eye openings and a rearwardly extending eye casing at each of the eye openings, and eye assemblies in said casings, each eye assembly comprising an outer protective sheet metal eye socket the front portion of which is hemispherical and cut away to mate with the eye opening in the doll's head and the outer portion of which is snugly received in the rubber casing, a hemispherical eye shell mounted within said socket, the socket being so punched inwardly at the side walls thereof as to displace but not remove metal, the displaced metal itself forming bearings passing through pivot holes in the side walls of the eye shell, said eye shell including a weight arm carrying an operating weight, the rear portion of the socket being integrally formed with rearwardly and outwardly sloping tangs embedded in the rubber casing.

14. A soft rubber doll head including eye openings, eye shells oscillatably mounted at said openings for opening or closing movement, each eye shell having rigidly attached thereto a stiff weight arm carrying an operating weight, and means to insure simultaneous opening or closing movement of the otherwise independently oscillatable eye shells, said means including a centrally coiled piece of spring wire having oppositely projecting ends secured to the weight arm.

15. A rubber doll head including eye openings and an inwardly projecting casing at each of the eye openings, and eye assemblies in said casings, each eye assembly comprising an outer protective sheet metal eye socket the front portion of which is open and the outer portion of which is snugly received in the rubber casing, a hemispherical eye shell mounted within said socket, the outer shell being so punched inwardly at the side walls thereof as to displace but not remove metal, the displaced metal itself forming bearings passing through pivot holes in the side walls of the eye shell, and a stiff weight arm on said eye shell, and means to insure simultaneous movement of the otherwise independently oscillatable eye shells including a piece of spring wire having its ends secured to the weight arms.

16. A rubber doll head including eye openings and an inwardly projecting casing at each of the eye openings, and eye assemblies in said casings, each eye assembly comprising an outer protective eye socket the front portion of which is open and the outer portion of which is snugly received in the rubber casing, a hemispherical eye shell mounted within said socket, the socket being punched inwardly at the side walls thereof to form bearings passing through pivot holes in the side walls of the eye shell, a weight arm on said eye shell, the socket being provided with tangs embedded in the rubber casing, and means to insure simultaneous movement of the otherwise independently oscillatable eye shells, said means including a coiled piece of spring wire having oppositely projecting ends secured to the weight arms.

17. A soft rubber doll head of the blown variety including eye openings and a rearwardly extending casing at each of the eye openings, and eye assemblies in said casings, each eye assembly comprising an outer protective eye socket shell the front portion of which is hemispherical and cut away to mate with the eye opening in the doll's head, a hemispherical eye shell oscillatably mounted within said outer shell, said eye shell including a rearwardly and then downwardly extending weight arm carrying an operating weight, the outer shell being provided with tangs embedded in the rubber casing, and means to insure simultaneous movement of the otherwise independently oscillatable eye shells, said means including a coiled piece of spring wire having oppositely projecting ends, one of said ends being secured to one of the weight arms and the other of said ends being reciprocable in the other of the weight arms.

18. A socket member for a doll's eye assembly, said socket member comprising a metallic shell-like element the front wall portion of which is generally hemispherical and cut away to form an eye opening, and the rear of which is open for the insertion of an eye member, said socket member being integrally formed with rearwardly and outwardly sloping tangs to help mount the same in a doll's head adjacent the eye opening therein.

19. A rubber doll head including an eye opening and an inwardly projecting rubber casing at the eye opening, said casing being generally cylindrical and being open at the rear or inner end thereof to facilitate insertion therein of a movable eye assembly from within the head, said end opening being smaller than the internal dimension of the casing and thereby forming a shoulder or flange for retaining the eye assembly within the casing.

LEO J. GRUBMAN.